US012300872B2

(12) United States Patent
Carpenter

(10) Patent No.: US 12,300,872 B2
(45) Date of Patent: May 13, 2025

(54) SIGNAL BOOSTING ANTENNA-ISOLATION ADAPTER

(71) Applicant: Honeywell International Inc., Charlotte, NC (US)

(72) Inventor: Kerrance Lynn Carpenter, Wake Forest, NC (US)

(73) Assignee: Honeywell International Inc., Charlotte, NC (US)

( * ) Notice: Subject to any disclaimer, the term of this patent is extended or adjusted under 35 U.S.C. 154(b) by 79 days.

(21) Appl. No.: 17/654,885

(22) Filed: Mar. 15, 2022

(65) Prior Publication Data

US 2023/0299458 A1 Sep. 21, 2023

(51) Int. Cl.
*H01Q 1/22* (2006.01)
*H01Q 1/38* (2006.01)
*H01R 24/54* (2011.01)

(52) U.S. Cl.
CPC ............ *H01Q 1/2233* (2013.01); *H01Q 1/38* (2013.01); *H01R 24/542* (2013.01)

(58) Field of Classification Search
CPC .......... H01Q 1/2233; H01Q 1/38; H01Q 1/52; H01Q 1/526; H01Q 1/528; H01R 24/542
See application file for complete search history.

(56) References Cited

U.S. PATENT DOCUMENTS

| | | | | | |
|---|---|---|---|---|---|
| 9,093,744 | B2 | 7/2015 | Seal et al. | | |
| 2011/0175749 | A1* | 7/2011 | Elsworth, III | ....... | H01Q 1/2233 340/870.02 |
| 2013/0057367 | A1* | 3/2013 | Smith | ....................... | H01P 5/02 333/24 C |
| 2013/0273859 | A1* | 10/2013 | King | ....................... | H04B 1/44 455/78 |

FOREIGN PATENT DOCUMENTS

| | | | |
|---|---|---|---|
| EP | 3650870 | A1 | 5/2020 |

* cited by examiner

*Primary Examiner* — Dimary S Lopez Cruz
*Assistant Examiner* — Aladdin Abdulbaki
(74) *Attorney, Agent, or Firm* — John Maldjian, Esq.; Stevens & Lee PC

(57) ABSTRACT

A system includes an isolation board. An insulator is configured to encapsulate the isolation board. The isolation board is tuned to deliver maximum power from a radio and present a fifty-ohm load to the radio. The isolation board is set at a distance from an antenna to protect a coaxial cable from reflected power from the antenna. The antenna is positioned next to the isolation board, wherein the antenna receives the maximum power delivered from the isolation board.

15 Claims, 4 Drawing Sheets

200

SIGNAL BOOSTING ANTENNA-ISOLATION ADAPTER

TECHNICAL FIELD

The present disclosure generally relates to minimizing radio-frequency current peaks inside a coaxial cable.

BACKGROUND

Electricity meters with radios often will use external antennas. These external antennas are located far from the meter. A radio-frequency (RF) coaxial cable can connect the meter to the external antenna.

In order to prevent dangerous voltages to be conducted from the electricity meter to the antenna, wherein a user touching the antenna can get shocked, an isolation board is placed in the electricity meter. The isolation board filters the dangerous alternating current voltage and only allows RF energy to pass.

When the electricity meter, and isolation board are positioned far from the external antenna, various problems can occur. The antenna can reflect back power to the isolation board that can cause functional issues in the coaxial cable connecting the electricity meter to the antenna.

The problems associated with the reflected power onto the coaxial cable can result in a loss of power and functioning for the electricity meter.

As such, a need exists for a system with the electricity meter, isolation board and antenna that are safer from the reflected power back from the antenna. In addition, a need exists for a system that does not have the problems with power due to the reflected power reflecting back onto the isolation board.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

The aforementioned aspects and other objectives can now be achieved as described herein.

In an embodiment, a system includes an isolation board configured at a first position. The system also includes an insulator configured at a second position. The insulator is configured to encapsulate the isolation board. The isolation board is tuned to deliver maximum power from a radio within an electricity meter and configured to present a fifty-ohm load to the radio. The isolation board is positioned at a distance from an antenna to protect a coaxial cable from reflected power from the antenna. The antenna is positioned next to the isolation board, wherein the antenna receives the maximum power delivered from the isolation board.

The distance of the isolation board to the antenna protects the coaxial cable from current-peaks formed within the coaxial cable.

The distance the isolation board is positioned from the antenna improves radio range of the radio.

The positioning of the isolation board prevents a loss of the power from the radio.

In another embodiment, a system also includes an electricity meter configured at an initial position. The system also includes an isolation board configured within the electricity meter, wherein the isolation board is configured to deliver maximum power from a radio within the electricity meter. The system also includes an insulator configured around the isolation board. The insulator is configured to encapsulate the isolation board, wherein a distance between the isolation board within the insulator and an antenna prevents one or more ripples from occurring within a coaxial cable. The system also includes antenna that receives the maximum power delivered from the isolation board, wherein the coaxial cable is positioned between the isolation board and the antenna.

The distance of the antenna from the isolation board prevents current peaks that dissipate the power.

The distance from the isolation board to the antenna prevents the power reflected back from the antenna to cause a loss of the radio range.

The position of the isolation board relative to the antenna enables for reduced consumption of the power by the radio.

In an embodiment, a method includes positioning an isolation board at a first position. The method also includes configuring an insulator at a second position. The insulator is configured to encapsulate the isolation board. The isolation board is tuned to deliver maximum from a radio within an electricity meter and present a fifty-ohm load to the radio. The isolation board within the insulator is positioned to be at a distance from an antenna to protect a coaxial cable from the reflected power from the antenna. The method also includes positioning the antenna next to the isolation board, wherein the antenna receives the maximum power delivered from the isolation board.

The method includes positioning the coaxial cable between the isolation board and the antenna.

The distance between the isolation board and antenna reduces potential ripples within the coaxial cable.

The method also includes increasing a radio range for an electricity meter.

BRIEF DESCRIPTION OF THE FIGURES

The accompanying figures, in which like reference numerals refer to identical or functionally similar elements throughout the separate views and which are incorporated and form a part of the specification, further illustrate the present invention and, together with the detailed description of the invention, serve to explain the principles of the present invention.

Figure 1:
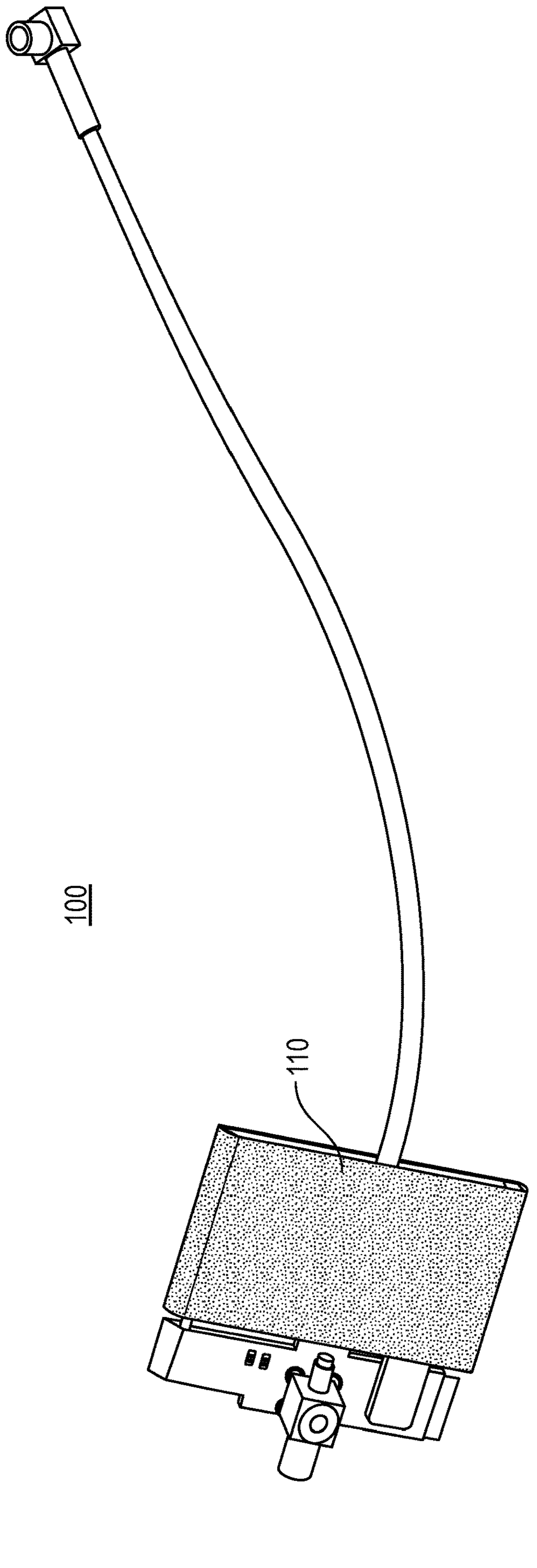
FIG. 1 illustrates a schematic diagram in accordance with an embodiment of the invention.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc.* v. *H.J. Heinz Co.,* 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ."

A description of an embodiment having components in communication with each other does not infer that all enumerated components are needed.

A commercial implementation in accordance with the scope and spirit of the present disclosure may be configured according to the needs of the particular application, whereby any function of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

More specifically, as will be appreciated by one skilled in the art, aspects of the present invention may be embodied as a system and/or method. Furthermore, aspects of the present invention may take the form of a plurality of systems.

Introduction

Embodiments of the present invention include an electricity meter that includes a radio. Within the electricity meter is an isolation board. An insulator will encapsulate the isolation board within the electricity meter. The isolation board will be placed as close as possible to an external antenna. A coaxial cable will be positioned in between the isolation board and the antenna. The coaxial cable will effectively connect the isolation board to the external antenna.

The isolation board will be an RF matching circuit that is made of reactances such as inductors and capacitors. The reactances of the isolation board are tuned to deliver power to an antenna. The isolation board will deliver maximum power from the radio within the electricity meter to the external antenna. The isolation board will also present a fifty-ohm load to the radio within the electricity meter.

Issues occur with the power being delivered to the external antenna. The external antenna will not be fifty ohms. The external antenna will reflect significant power back into the isolation board. The coaxial cable will be placed between the isolation board and the external antenna. The reflected power can cause waves or ripples inside of the coaxial cable. The ripples inside the coaxial cable can lead to radio-frequency current peaks that dissipate much more power. In addition, there can be a significant loss of radio range for the radio configured within the electricity meter.

The problems with the reflected power can be remedied with the alignment of the isolation board relative to the antenna. When the isolation board is placed as close as possible to the external antenna, the problems associated with the reflected power back from the antenna are dramatically reduced or eliminated, or otherwise minimized. There ripples within the coaxial cable that cause the current-peaks are not as likely to occur. As a result, the dissipation of a lot more power is not as likely to happen. In addition, the lack of waves or ripples in the coaxial cable does not result in a significant loss of radio range of the radio in the electricity meter.

As such, the result of placing the isolation board as close a possible to the antenna will result in a necessary isolation for safety. In addition, the radio-frequency current peaks inside the coaxial cable are minimized. Power consumption of the electricity meter is reduced as well.

System Structure

FIG. 1 illustrates an isolation board 100 within an electricity meter. An insulator 110 encapsulates the isolation board 100. The isolation board 100 encapsulated within the insulator 110 can be positioned within an electricity meter. To prevent dangerous voltages from being conducted from the electricity meter to a nearby antenna, the isolation board 100 is placed within the electricity meter. A user may accidentally touch the antenna and get shocked. As such, the isolation board 100 is placed within the electricity meter, with the insulator 110 encapsulating the isolation board 100, Moreover, the isolation board filters alternating current (AC) voltage, wherein only radio frequency energy is allowed to pass. The isolation board can be a radio frequency (RF) matching circuit. The isolation board 100 will also be made up of reactances that include inductors and capacitors. The reactances of the isolation board 100 are tuned to deliver maximum power from a radio within the electricity meter to a nearby antenna. In addition, the isolation board 100 will present a fifty-ohm load to the radio within the electricity meter.

Referring to 1, the isolation board 100 and insulator 110 will typically be placed as close as possible to a nearby antenna. Placing the isolation board 100 close to the antenna will prevent the reflected power from the antenna to cause waves or ripples onto the coaxial cable positioned between the isolation board 100 and the antenna. The farther away the isolation board 100 is away from an antenna, the more likely that power reflected back from the antenna can cause ripples within the coaxial cable that is positioned between isolation board 100 and the antenna. The reduced distance between the isolation board 100 and the antenna will effectively reduce the probability for waves to form within the coaxial cable due the power reflected by the antenna onto the cable. With the lesser probability of ripples occurring within the coaxial cable due to the reflected power from the antenna, the loss of power due to current peaks do not occur as frequently due to the reflected power causing ripples within the coaxial cable. The reduction in any reflected power onto the coaxial cable also ensures that there is not a significant loss of radio range for the nearby radio within the electricity meter.

In FIG. 1, in summary, when the isolation board encapsulated within the insulator 110 is positioned as close as possible to an antenna configured in a remote-antenna installation location, the reactances of the isolation board 100 deliver maximum power from the radio in the electricity meter to the antenna. The isolation board 100 also presents a fifty-ohm load to the radio within the electricity meter. Due to the close proximity of the isolation board 100 to the antenna, any reflected power that may cause ripples within the coaxial cable is minimized. The lack of ripples within the coaxial cable will limit any current-peaks that will dissipate much more power. In addition, there will not be a significant loss of radio range for the radio within the electricity meter.

Figure 2:
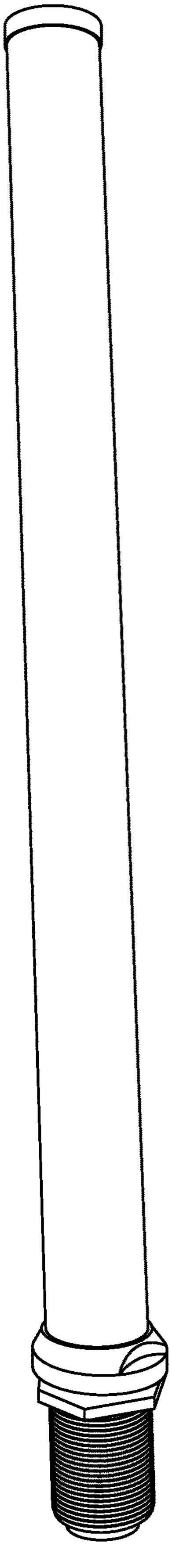
FIG. 2 illustrates another aspect of the schematic diagram in accordance with an embodiment of the invention.

Referring to FIG. 2, an antenna 200 is illustrated. The antenna 200 will be configured in a remote-antenna installation location apart from the isolation board described in FIG. 1 and the electricity meter. The antenna 200 will receive maximum power from the isolation board through the radio within the electricity meter. The antenna 200 is capable of reflecting back the power received from the isolation board as the antenna is not a fifty-ohm antenna. The antenna 200 reflecting the power back can affect the coaxial cable positioned between the antenna and the isolation board. The power that the antenna 200 reflects back can cause a series of waves within the coaxial cable. The waves can be ripples inside of the coaxial cable. The ripples inside of the coaxial cable will cause current-peaks that will dissipate much more power in the coaxial cable. The effects of the reflected power will also including causing a loss of radio range to the radio within the electricity meter.

With respect to FIG. 2, the position of the isolation board relative to the antenna 200 will ensure that the effects of ripples within the coaxial cable minimize the current-peaks that dissipate power and loss of radio range. The closer the distance that the isolation board is to the antenna 200, the less likely that the reflected power from the antenna 200 will ripple up or cause ripples or other damage inside the coaxial cable that is positioned between the antenna 200 and the isolation board. The ripples inside of the coaxial cable will be minimized. The closer distance between the antenna 200 and the isolation board ensures that the current peaks that dissipate a lot of power are less likely to occur. When the power is not dissipated as much, there is also not a significant loss in the radio range with the radio in the electricity meter. As such, placing the isolation board closer or as close as possible to the antenna 200 positioned in the remote-antenna installation location takes away the extra distance that can cause the ripples within the coaxial cable.

Referring to FIG. 2, the problems due to the reflected power that the antenna reflects back onto the coaxial cable can be minimized by reducing the distance between the isolation board and the antenna 200. Although the coaxial cable is positioned between the antenna 200 and the isolation board, the reduced distance between the antenna in the remote-antenna installation location and the isolation board will ensure that the power the antenna 200 receives from the radio and reflected back onto the coaxial cable is minimized so that a series of ripples within the coaxial cable are minimal as a result. As the ripples can cause current-peaks that will dissipate a lot more power, the reduced distance between the isolation board to the antenna 200 will ensure that the ripples do not occur or are much less frequent within the coaxial cable situated between the isolation board and the antenna 200. In addition, the reduced distance ensures that there will not be a significant loss of radio range of the radio within the electricity meter. As a result, there will be a longer radio range, safer installation, and reduced power consumption in and around the electricity meter.

Figure 3:
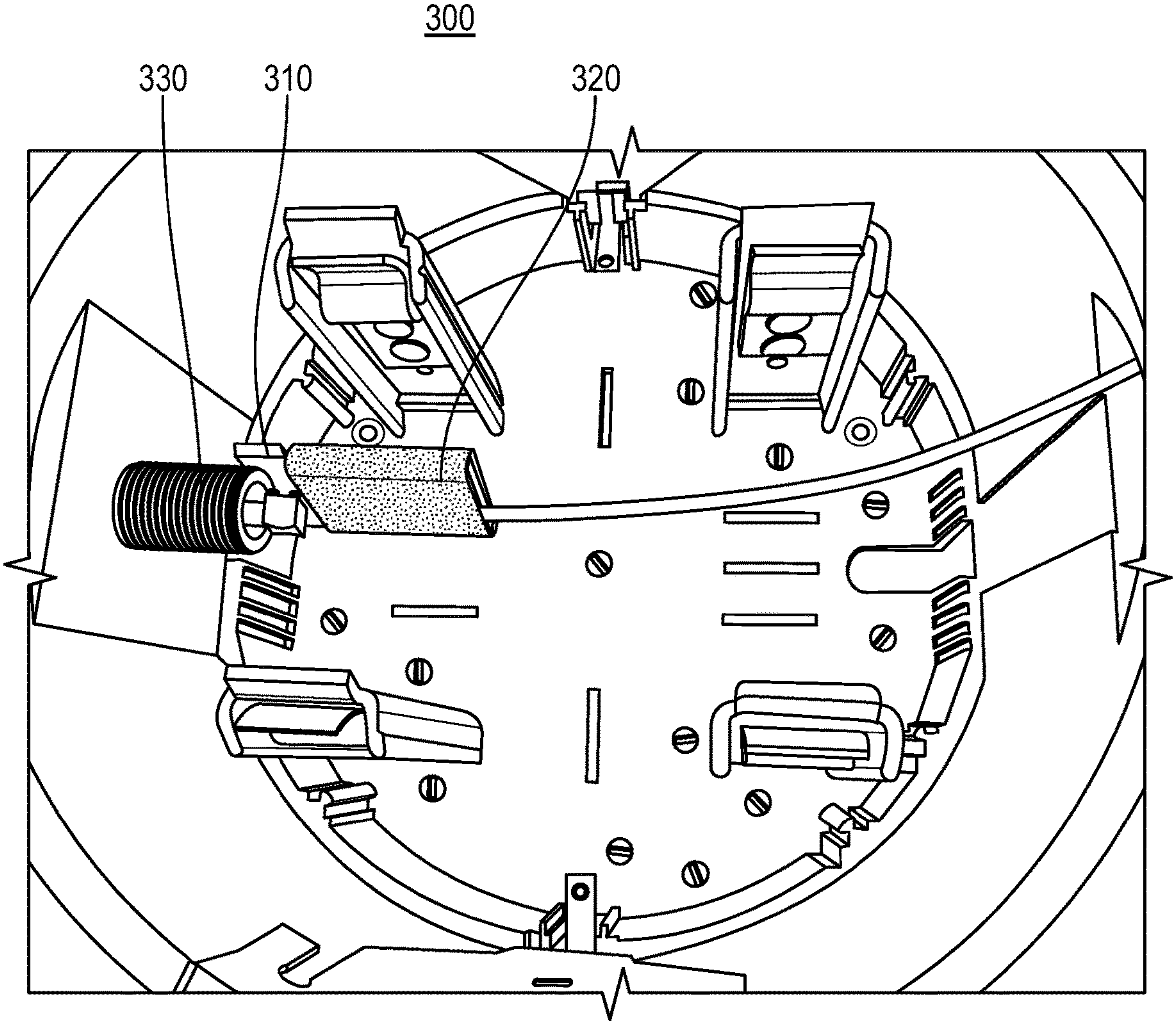
FIG. 3 illustrates a further aspect of the schematic diagram in accordance with an embodiment of the invention.

In FIG. 3, an electricity meter 300 is illustrated. Within the electricity meter 300, an isolation board 310 is shown, wherein an insulator 320 encapsulates the isolation board 310. The isolation board 310 and insulator 320. Next to the isolation board 310 is a coaxial cable 330 that passes through an input to the antenna outside of the electricity meter 300. Further, next to the coaxial cable 330 is the antenna located outside of the electricity meter 300. The antenna will be configured apart from the isolation board 310 in a remote-antenna installation location.

With respect to FIG. 3, the position or distance of the isolation board 310 from the antenna can determine how much damage due to reflected power from the antenna is minimized on the coaxial cable 330 that is positioned in the input. The reactances of the isolation board can include an RF matching circuit. The isolation board 310 can include an RF matching circuit, and reactances that include inductors and capacitors. The reactances of the isolation board 310 are tuned to deliver power to a fifty-ohm antenna. However, the antenna is not fifty ohms. As such, the antenna will reflect significant power back into the isolation board 310. The reflected power can adversely affect the coaxial cable 330 within the input. Waves from the reflected power can be formed within the coaxial cable 330 that can lead to ripples inside of the coaxial cable 330. When the ripples occur within the coaxial cable 330, current-peaks can occur. The current-peaks can dissipate much more power as a result. Another disadvantage is that there can be significant loss of radio range of a radio within the electricity meter 300.

In FIG. 3, to remedy these potential problems, the distance of the isolation board 310 to the antenna is minimized. In other words, the isolation board 310 is kept as close as possible to the antenna, with the antenna positioned outside of the electricity meter 300. With the close distance of the isolation board 310 to the antenna, the potential for waves and ripples within the coaxial cable 330 is minimized and dramatically reduced. When the tipples within the coaxial cable 330 is reduced or eliminated, the current-peaks that dissipate much more power is also reduced or eliminated as a result. In addition, the significant loss of radio range of the radio in which the isolation board 310 utilizes to deliver the maximum power to the antenna also does not occur or is minimized. The close distance between the isolation board 310 and the antenna dramatically reduces or altogether eliminates the problems associated with the reflected power from the antenna.

Referring to FIG. 3, in summary, the various issues of power which the antenna reflects hack onto the coaxial cable 330 positioned between the isolation board 310 and the antenna can be remedied by configuring the isolation board 310 as closely as possible to the antenna. The close distance between the isolation board 310 and the antenna virtually eliminates or dramatically reduces any ripples or waves that occurs within the coaxial cable 330 between the isolation board 330 and the antenna. With the eliminated or dramatically reduced ripples within the coaxial cable 330, the current-peaks within the coaxial cable 330 that will dissipate much power is less likely occur. There is also not a significant loss of radio range for the radio within the electricity meter as well. As such, the configuration of keeping the isolation board 310 close to the antenna can cure or minimize the key deficiencies that occur from the power that the antenna reflects back to the isolation board 310.

Figure 4:
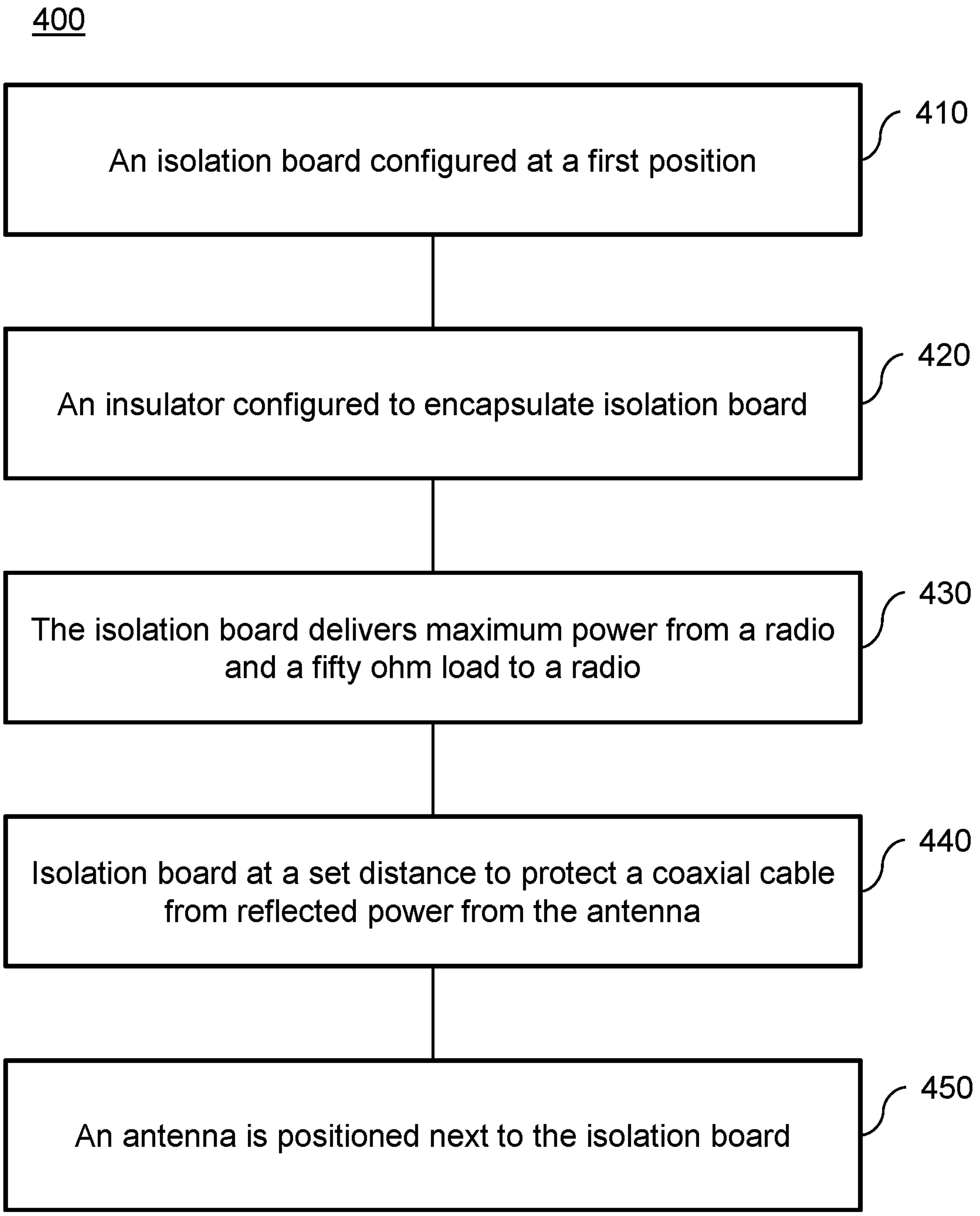
FIG. 4 illustrates a flow chart in accordance with an embodiment of the invention.

In FIG. 4, a process 400 is illustrated that illustrates how the isolation board is positioned closely to the antenna. Moreover, the process 400 illustrates how positioning the isolation board as close as possible to the antenna can minimize the deficiencies due to the power reflected back by the antenna to the isolation board.

In FIG. 4, at step 410, an isolation board is configured at a first position. The isolation board can be configured in the first position within an electricity meter. The isolation board is placed as close as possible to an antenna within the same system and outside of the electricity meter.

In FIG. 4, at step 420, an insulator is configured to encapsulate the isolation board within the electricity meter. When the isolation board delivers maximum power to the antenna, the isolation board will be encapsulated within the insulator.

In FIG. 4, at step 430, the isolation board delivers maximum power to the antenna from the radio within the electricity meter. Further, the isolation board presents a fifty-ohm load to the radio within the electricity meter. As the antenna will not be a fifty-ohm antenna, some of the power delivered to the antenna will be reflected back to the isolation board.

Referring to FIG. 4, at step 440, the isolation board is set at a distance from the antenna to protect a coaxial cable from reflected power from the antenna. The coaxial cable will be situated between the isolation board and the antenna. The antenna will reflect back the power received from the isolation board. The reflected power can adversely affect the coaxial cable if the isolation board is too far from the antenna. A series of waves or ripples can form within the coaxial cable, which can cause current-peaks that will dissipate a lot of power. In addition, a loss of radio range of the radio can occur. Accordingly, when the isolation board is positioned as close as possible to the antenna, the problems with the reflected power causing ripples on the coaxial cable are eliminated or dramatically reduced and altogether minimized. Moreover, the current-peaks that dissipate power are also dramatically reduced or eliminated. In addition, the loss of radio range of the radio within the electricity meter is not as likely to occur. Overall, placing the isolation board very close to the antenna will minimize many of the problems that occur due to the reflected power from the antenna.

In FIG. 4, at step 450, the antenna is positioned adjacent or next to the isolation board. The antenna will also be positioned outside of the electricity meter. With the close proximity of the antenna to the isolation board, the reflected power from the antenna is less likely to cause the ripples in the coaxial cable positioned between the antenna and the isolation board.

Those skilled in the art will appreciate that the example embodiments are non-exhaustive and that embodiments other than that described here may be included without departing from the scope and spirit of the presently disclosed embodiments.

Advantages/Summary

An isolation board within an electricity meter is encapsulated within an isolation board. The isolation board is an RE matching circuit that is made of reactances that include inductors and capacitors. The isolation board delivers maximum power to an antenna from the radio within the electricity meter. The isolation board also presents a fifty-ohm load to the radio. When the isolation board within the electricity meter delivers maximum power to the antenna, the antenna reflects the power back to the isolation board. The antenna will not be at fifty ohms. The reflected power can cause problems for a coaxial cable positioned between the isolation board and the antenna.

Potential problems that the reflected power from the antenna can cause to the coaxial cable include waves or ripples that will cause current-peaks that will dissipate more power within the electricity meter. There will also be a loss of radio range within the electricity meter.

The isolation board within the electricity meter is placed as close as possible to the antenna to remedy the problems of reflected power from the antenna board to the isolation board. The very close distance from the isolation board to the antenna will prevent, minimize, or substantially reduce the ripples inside the coaxial cable between the isolation board and the antenna. In addition, the current-peaks that dissipate more power in the electricity meter will also be minimized. Further, the radio range of the electricity meter will also not be lost.

Overall, there is a necessary isolation for safety while minimizing the radio-frequency current peaks inside the coaxial cable. In addition there is longer radio range for the radio within the electricity meter. Further, there is also safer installation for lineman and reduced power consumption by the radio within the electricity meter.

CONCLUSION

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A system comprising:

an isolation board is configured at a first position;

an insulator is configured at a second position, wherein the insulator is configured to encapsulate the isolation board, wherein the isolation board provides reactances that are tuned to deliver maximum power from a radio within an electricity meter, and configured to present an impedance of fifty-ohm to the radio; and an antenna, having an impedance different from the impedance of the isolation board, is positioned at a predetermined distance from the isolation board to eliminate ripples in a coaxial cable generated from reflected power from the antenna, wherein the antenna receives the maximum power delivered from the isolation board.

2. The system of claim 1, wherein the predetermined distance of the isolation board from the antenna protects a radio range of the radio.

3. The system of claim 1, wherein the predetermined distance of the isolation board from the antenna prevents a loss of power from the radio.

4. The system of claim 1, wherein the antenna is positioned in a remote installation location apart from the insulator and isolation board.

5. The system of claim 1, wherein the isolation board is positioned in the electricity meter.

6. A system comprising: an electricity meter configured at an initial position;

an isolation board is configured within the electricity meter, wherein the isolation board provides reactances that are tuned to deliver maximum power from a radio within the electricity meter, and wherein the isolation board presents an impedance of fifty-ohm to the radio;

an insulator is configured around the isolation board, wherein the insulator is configured to encapsulate the isolation board; and an antenna, having an impedance different from the impedance of the isolation board, is positioned at a predetermined distance from the isolation board to eliminate ripples in a coaxial cable generated from reflected power from the antenna, wherein the coaxial cable couples the isolation board with the antenna, wherein the antenna receives the maximum power delivered from the isolation board.

7. The system of claim 6, wherein the predetermined distance from the isolation board to the antenna prevents the reflected power from the antenna to cause a loss of a radio range of the radio.

8. The system of claim 6, wherein a position of the isolation board relative to the antenna enables reduced consumption of power by the radio.

9. The system of claim 6, wherein a radio range of the radio is increased based on the predetermined distance.

10. The system of claim 6, wherein the isolation board is positioned adjacent to the antenna.

11. A method comprising: positioning an isolation board configured at a first position;

configuring an insulator at a second position, wherein the insulator is configured to encapsulate the isolation board, wherein the isolation board provides reactances that are tuned to deliver maximum power from a radio within an electricity meter, and wherein the isolation board is configured to present an impedance of at least a fifty-ohm load to the radio;

positioning an antenna, having an impedance different from the impedance of the isolation board, at a predetermined distance from the isolation board to eliminate ripples in a coaxial cable generated from reflected power from the antenna, wherein the antenna receives the maximum power delivered from the isolation board.

12. The method of claim 11, further comprising: positioning the coaxial cable between the isolation board and the antenna.

13. The method of claim 11, further comprising: increasing a radio range for the electricity meter based on the predetermined distance between the isolation board and the antenna.

14. The method of claim 11, further comprising: reducing current peaks within the coaxial cable based on the predetermined distance between the isolation board and the antenna.

15. The method of claim 11, further comprising: reducing consumption of the power delivered by radio based on the predetermined distance between the isolation board and the antenna.

* * * * *